United States Patent [19]

Chung et al.

[11] Patent Number: 5,699,119
[45] Date of Patent: Dec. 16, 1997

[54] QUANTIZATION METHOD AND CIRCUIT THEREFOR

[75] Inventors: Tae-yun Chung, Kwacheon; Gyu-hwan Jung, Kyungki-do, both of Rep. of Korea

[73] Assignee: Samsung Electronics Co., Ltd., Kyungki-Do, Rep. of Korea

[21] Appl. No.: 413,831

[22] Filed: Mar. 30, 1995

[30] Foreign Application Priority Data

Mar. 31, 1994 [KR] Rep. of Korea .................. 94-6801

[51] Int. Cl.$^6$ ...................................................... H04N 7/32
[52] U.S. Cl. ............................................... 348/405; 348/420
[58] Field of Search ................................. 348/405, 419, 348/406, 401, 403, 409, 411, 420; 382/239, 251

[56] References Cited

U.S. PATENT DOCUMENTS 5,307,163  4/1994  Hatano et al. .................. 348/420
5,543,848  8/1996  Murakami et al. .................. 348/405

*Primary Examiner*—Amelia Au
*Attorney, Agent, or Firm*—Rothwell, Figg Ernst & Kurz

[57] ABSTRACT

In a method for quantizing a moving picture signal and a circuit therefor, the method includes the steps of calculating horizontal and vertical gradients of first pixel values in a macroblock, determining each maximum value of the horizontal and vertical gradients, classifying the moving picture signal into complexity class if the maximum value is greater than a first threshold value and into edge class if the maximum value is greater than a second threshold value and is less than a third threshold value, calculating an activity value with respect to the first pixel values in the macroblock by calculating the sum of absolute values of DCT coefficients for four blocks in the macroblock, calculating an activity normalization coefficient, using the activity value of the macroblock and an average activity value of all pixels of the same picture type; and calculating a reference quantization step size produced by a backward rate control through a forward estimation considering coding efficiency and a visual characteristic which depends on the class of the moving picture signal and the energy of DCT coefficients. Therefore, a high efficiency and high picture quality moving picture compressor can be implemented.

2 Claims, 3 Drawing Sheets

5,699,119

1

QUANTIZATION METHOD AND CIRCUIT THEREFOR

Background of the Invention

The present invention relates to a quantization method and a circuit therefor, and more particularly, to a quantization method for the high efficiency coding of a moving picture and a circuit therefor.

Widely adopted storage and transmission systems for picture information normally utilize an analog method, but digital methods can enhance picture quality, improve system reliability and facilitate data processing. Therefore, there has been much research into digital video signal processing technology which can be adopted by an integrated services digital network and for high definition television and video conferencing systems, and such applied fields will continue to expand. However, since a digital video signal processing system requires a great deal of information, data compression becomes necessary for efficient utilization of transmission channels and storage media.

Meanwhile, the advantage of video coding with the discrete cosine transform (DCT) technique is that the information of an original picture signal can be expressed efficiently with very few bits by fully coding the low-frequency portion of DCT-coded picture signal, where the energy is concentrated. Also, in variable-length coding, the length of a given code word is allotted variably with reference to probability density of the picture information, so that a code word having a variable length is transmitted. This method is suitable for the case when moving picture signals to be processed are distributed unevenly in the frequency domain.

Thus, a variable-length coding method through DCT coding is relatively efficient as a compression method for fully expressing moving picture signals having unevenly distributed picture information.

However, the DCT-coded picture signal ordinarily has a smaller variance but larger dynamic range, compared with the original picture signal. Therefore, since expression of the DCT-coded picture signal requires much greater information quantity, the information quantity needs to be reduced. This can be accomplished by expressing with a limited number of codes through a quantization process with respect to the DCT-coded picture signal. That is to say, the quantization process is a process of approximating the DCT-coded picture signal into codes of a given variable-length code book. Thus, distortion of the picture signal is generated by the quantization process for expressing the original picture signal as representative values of a given number, which ultimately results in the deterioration of picture quality.

In general, since the information quantity (bits) generated per unit time should be constant when the variable-length coded picture signal is stored or transmitted, a buffer is installed and forward or backward rate control is executed for the buffer, thereby adjusting the quantization step size and adjusting the generated bit quantity accordingly.

The conventional forward rate control method has an advantage in that errors due to a storage or transmission medium are propagated only within a given fixed-length unit. However, it is difficult to exactly match the generated bit quantity with target bit quantity of fixed-length unit, so that the coding efficiency is lowered.

Also, the conventional backward rate control method has an advantage in that the generated bit quantity to be stored or transmitted is easily matched with target bit quantity since the quantization step size is determined by the fullness of the buffer, by periodically checking the buffer state. However, since the quantization step size is determined irrespective of human visual characteristics, the picture quality is likely to be poor.

Recently, as shown in FIG. 1, a hybrid method of motion compensation coding (MCC) and DCT coding is adopted in order to compress a much larger bit quantity. Also, in order to improve the poor picture generated by the above-described rate control method, there has been proposed a final tuning method by forward estimation, that is, the complexity discrimination of a local picture, with reference to a quantization step size updated by the backward rate control method. However, this method considers only the visual characteristics of a spatial domain as the reference of the complexity determination. Thus, the coding efficiency is lowered due to a mismatch between the actually coded data characteristics and visual characteristics in MCC-coding a reference signal, thereby generating picture quality deterioration.

SUMMARY OF THE INVENTION

It is an object of the present invention to provide a quantization method for dispersing the quantization errors causing an information distortion and picture quality deterioration, in compressing a DCT-coded moving picture signal by VLC coding, suitable to human visual characteristics and selecting the reference quantization step size.

It is another object of the present invention to provide a quantization circuit for implementing the above method.

To accomplish the above object, a method for quantizing a moving picture signal according to the present invention comprises the steps of: calculating horizontal and vertical gradients of first pixel values in a macroblock; determining each maximum value of the horizontal and vertical gradients; classifying the moving picture signal into complexity class if the maximum value is greater than a first threshold value and into edge class if the maximum value is greater than a second threshold value and is less than a third threshold value; calculating an activity value with respect to the first pixel values in the macroblock by calculating the sum of absolute values of DCT coefficients for four blocks in the macroblock; calculating an activity normalization coefficient, using the activity value of the macroblock and an average activity value of all pixels of the same picture type; and calculating a reference quantization step size produced by a backward rate control through a forward estimation considering coding efficiency and a visual characteristic which depends on the class of the moving picture signal and the energy of DCT coefficients.

To accomplish another object, a circuit for quantizing a moving picture signal according to the present invention comprises: means for calculating horizontal gradients of first pixel values in a macroblock and calculating a mean value of the respective gradients; means for calculating vertical gradients of first pixel values in a macroblock and calculating a mean value of the respective gradients; means for determining each maximum value of the horizontal and vertical gradients; means for classifying the moving picture signal into complexity class if the maximum value is greater than a first threshold value and into edge class if the maximum value is greater than a second threshold value and is less than a third threshold value; means for calculating an activity value with respect to the first pixel values in the macroblock by calculating sum of absolute values of DCT coefficients for four blocks in the macroblock; means for calculating an activity normalization coefficient, using the activity value of the macroblock and an average activity value of all pixels of the same picture type; and means for calculating a reference quantization step size produced by a backward rate control through a forward estimation considering coding efficiency and a visual characteristic which depends on the class of the moving picture signal and the energy of DCT coefficients.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
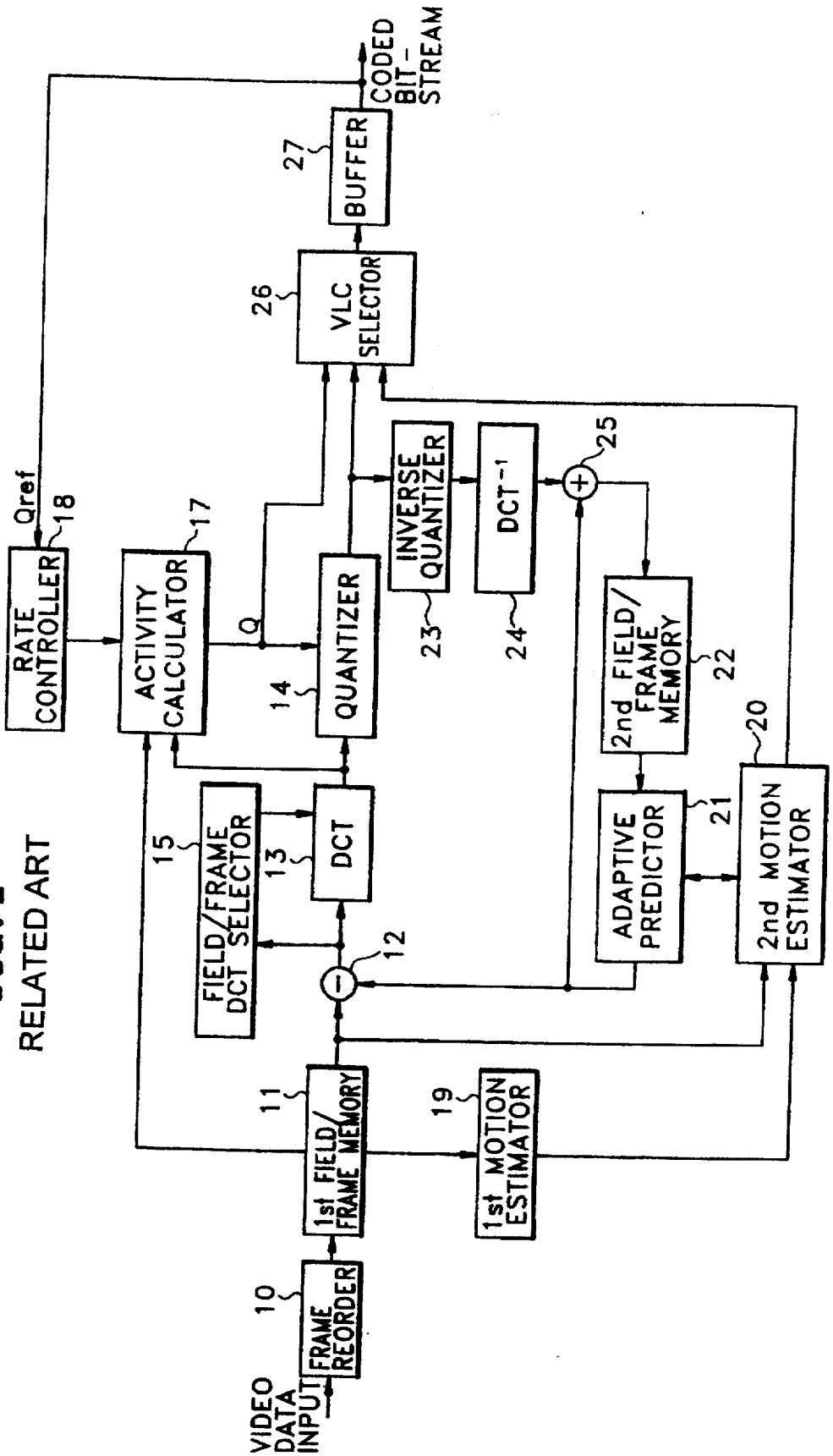
FIG. 1 is a block diagram of a conventional moving picture compressor.
Figure 2:
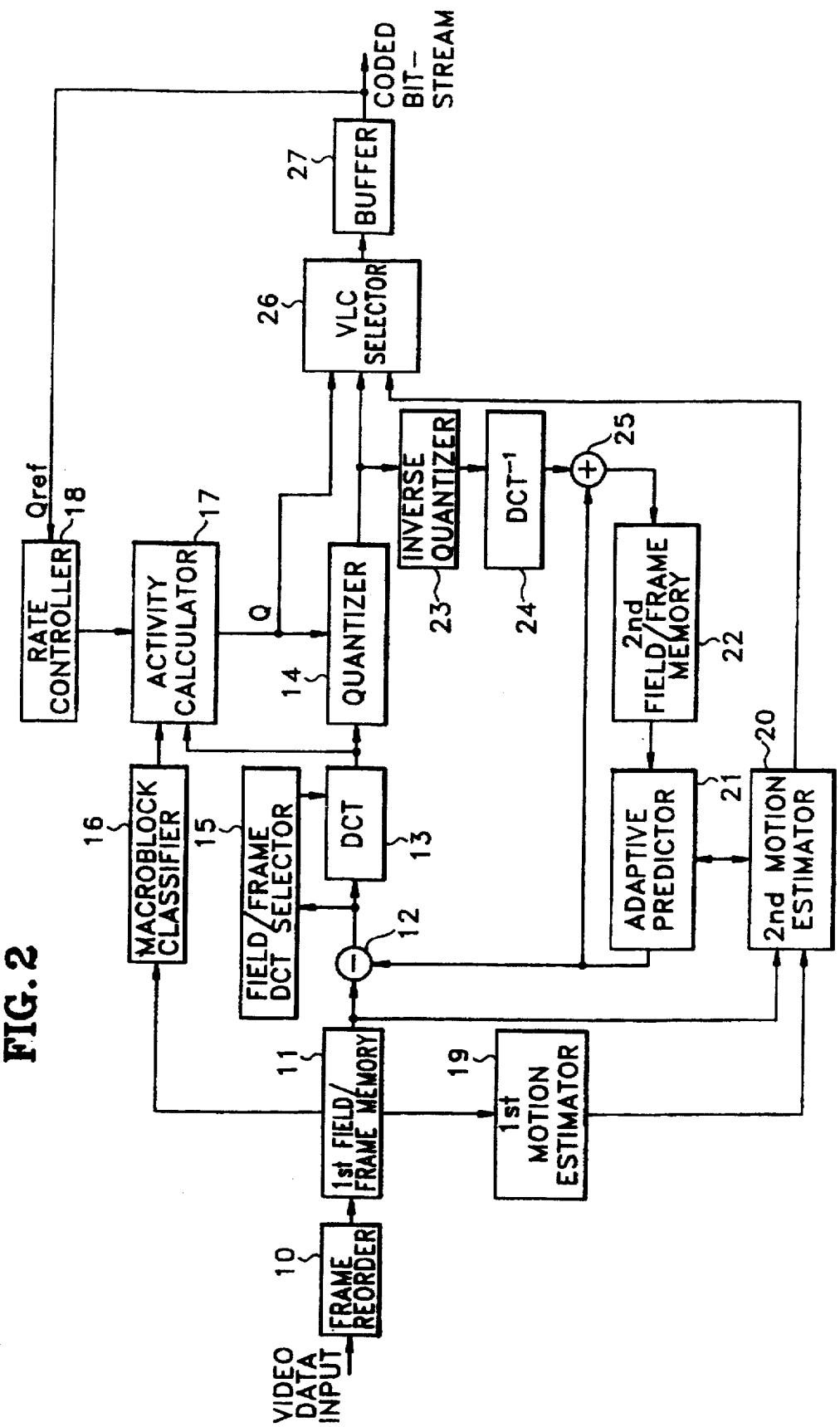
FIG. 2 is a block diagram of a moving picture compressor according to the present invention.

In FIG. 2, the moving picture compressor is constituted by a frame reorder 10, a first field/frame memory 11, a subtracter 12, a DCT circuit 13, a quantizer 14, a field/frame DCT selector 15, a macroblock classifier 16, an activity calculator 17, a rate controller 18, a first motion estimator 19, a second motion estimator 20, an adaptive predictor 21, a second field/frame memory 22, an inverse quantizer 23, an inverse DCT (DCT$^{-1}$) circuit 24, an adder 25, a variable-length coding (VLC) selector 26, and a buffer 27.

The DCT coding method is a technique for compressing data by two-dimensionally converting an original picture, obtaining statistical properties of the conversion coefficients and adopting a quantization method suitable to the statistical properties.

The moving picture compressor converts an input signal having a 4:2:2 format (Y: 720 pixels×480 lines; and Cr and Cb: 360 pixels×480 lines) into one having a 4:2:0 format by line-subsampling the input signal with respect to the color difference signals. Then, the signal is used as the input signal source of an encoder. Also, in the quantizer updating unit of a macroblock (Y: 16 pixels×16 lines; Cr and Cb: 8 lines×8 pixels), a rate control and forward estimation are executed. In the forward estimation, a moving picture signal is classified in a spatial domain in view of human visual characteristics, and selects a quantizer for one macroblock by a final tuning process of the reference quantization step size produced by a rate control by setting the activity using actually coded DCT coefficients as a parameter in view of coding efficiency.

Figure 3:
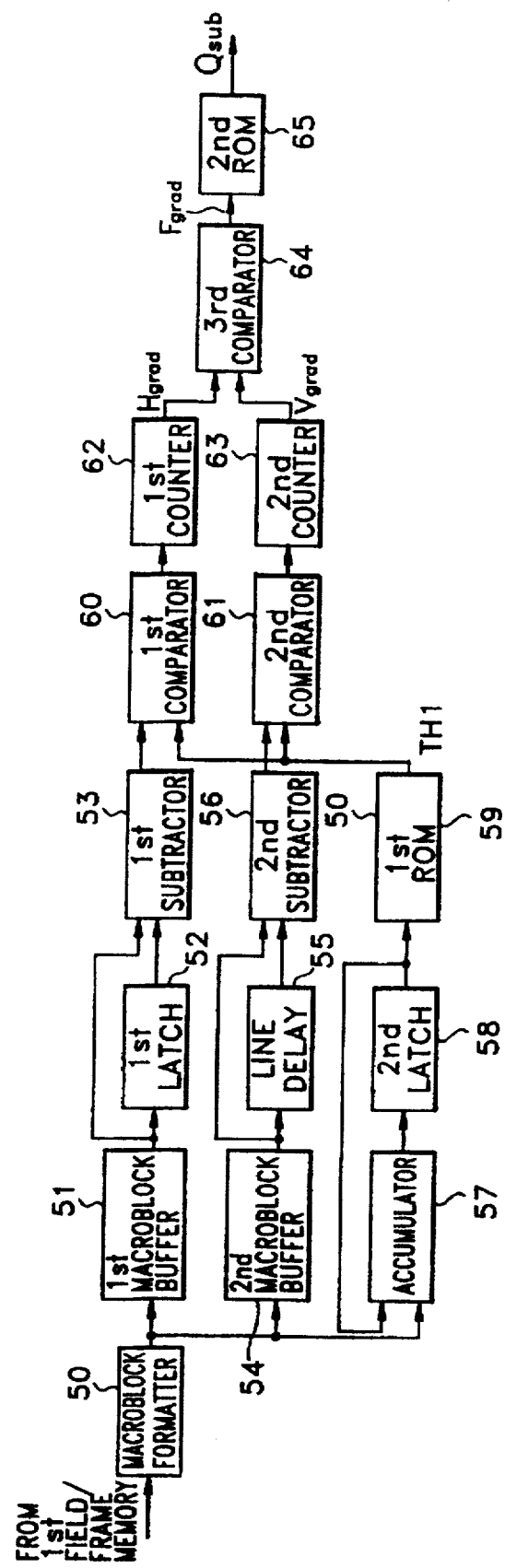
FIG. 3 is a block diagram of the macroblock classifier shown in FIG. 2.

FIG. 3 is a block diagram of the macroblock classifier 16 shown in FIG. 2. In FIG. 3, the macroblock classifier 16 is constituted by a macroblock formatter 50, a first macroblock buffer 51, a first latch 52, a first subtracter 53, a second macroblock buffer 54, a line delay 55, a second subtracter 56, an accumulator 57, a second latch 58, a first ROM 59, a first comparator 60, a second comparator 61, a first counter 62, a second counter 63, a third comparator 64, and a second ROM 65.

In the present invention, a moving picture signal is classified into two classes with respect to spatial domain, i.e., edge class and complexity class, irrespective of whether the picture is intraframe or interframe. The above classification is performed in order to select a quantizer which reflects the human visual characteristic while the overall generated bit quantity is made to be the same as that before classification. The bit quantity is held constant by more finely quantizing the macroblock having many edge components and by more coarsely quantizing the macroblock having many complexity components, using a sensitivity characteristic of the human visual system which is more sensitive to an active area than an inactive area and is much more sensitive to an edge.

The method of the classification utilizes pixel gradients of luminance signal Y (16×16) in one macroblock and brightness property and the classification basis is as follows.

The horizontal gradient $H_{grad}$ is obtained by the following equation.

$$H_{grad} = \sum_{i=2}^{16} \sum_{j=1}^{16} dH(i,j)$$

where, assuming that SP(i,j) is the (i,j) pixel value within a given macroblock, if |SP(i,j)−SP(i−1,j)| is greater than TH1, dH(i,j) is equal to one and is otherwise equal to zero.

At this time, the reference value (here, $MB_{mean}$) for determining a pixel gradient is adopted differentially depending on the average brightness of a macroblock. That is, the classification is made suitable to the human visual characteristics by making the difference between pixel gradients large when the average brightness is extreme, i.e., either very low or very high, due to different edge determining capability on which the human visual system is responsive.

That is, it is assumed that $$MB_{mean} = \frac{1}{256} \sum_{i=1}^{16} \sum_{j=1}^{16} SP(i,j).$$

Then, TH1 is equal to $MB_{mean+2}+K1$ if $MB_{mean}$ is less than A, is equal to $MB_{mean+2}+K2$ if $MB_{mean}$ is greater than B, and is otherwise equal to $MB_{mean+2}+K3$.

Here, $MB_{mean}$ is an average brightness, A is less than 96 and B is greater than 200. Also, K1, K2 and K3 are weight value depending on DC components of the macroblock. K1 is greater than K2 and K2 is greater than K3. The $MB_{mean+2}$ indicates a two-bit shift to the right.

The vertical gradient $V_{grad}$ is obtained by the following equation.

$$V_{grad} = \sum_{I=1}^{16} \sum_{J=2}^{16} dV(i,j)$$

Here, dV(i,j) is equal to one if |SP(i,j)−SP(i,j−1)| is greater than TH1, and is otherwise equal to zero, by comparing each output of first subtracter 53 and second subtracter 56 with TH1 in first comparator 60 and second comparator 61, respectively. The final gradient $F_{grad}$ is determined by comparing the outputs of first counter 62 and second counter 63 in third comparator 64.

Therefore, the classification into edge and complexity classes is executed as follows, using the final gradient which is a determinant value of the gradient of the above macroblock.

In second ROM 65, the complexity class $Q_{sub}$ is equal to two if final gradient $F_{grad}$ is greater than NO_TH1 is equal to −2 if final gradient is not greater than NO_TH2 and is greater than NO_TH3, is otherwise equal to zero. Also, NO_TH1, NO_TH2 and NO_TH3 are predetermined threshold values for determining complexity, based on human visual characteristics, and are stored in second ROM 65. NO_TH1 is greater than NO_TH2 and NO_TH2 is greater than NO_TH3.

Using the sum of absolute values of DCT coefficients for four sub-blocks (8×8) with respect to the Y signal (16×16) of one macroblock, as the activity parameter A of an interframe picture or an intraframe picture used in actual coding, the activity parameter A is calculated. The activity parameter A is the minimum value of the absolute sum for each of subblocks one to four. Here, the absolute sum for each of subblocks one to four can be expressed as follows:

$$\left( \sum_{i=1}^{8} \sum_{j=1}^{8} |C_{i,j}| \right) - |C_{1,1}|$$

where $C_{i,j}$ is a DCT coefficient of $(i,j)$.

Therefore, by the thus-calculated value of activity parameter A of one macroblock and the average activity of all pictures of the same picture type, the activity normalization parameter $N_{act}$ is calculated as follows.

$$N_{act} = \frac{2A + A_{avg}}{A + 2A_{avg}}$$

The basis for calculating the activity normalization parameter $N_{act}$ is to desirably tune a quantizer in consideration of the DCT energy. The desirable tuning selects a more fine quantizer for a small energy area and selects a coarser quantizer for a large energy area, because the small energy area of the DCT area is more sensitive visually than the large energy area thereof in view of a general picture characteristic.

A quantizer parameter (Q) selector tunes by the following equation the reference quantization step size $Q_{ref}$ produced by a backward rate control through a forward estimation considering coding efficiency and a visual characteristic which depends on the class of the moving picture signal and the energy of DCT coefficients.

$$Q = Q_{ref} \times N_{act} + Q_{sub}$$

Therefore, according to the present invention, an efficient quantizer can be selected depending on human visual characteristics and coding efficiency, thereby implementing a moving picture compressor having a high efficiency and high picture quality.

What is claimed is:

1. A method for quantizing a moving picture signal comprising the steps of:

calculating horizontal and vertical gradients of first pixel values in a macroblock;

determining a final gradient by comparison of said horizontal and vertical gradients;

classifying said moving picture signal into a complexity class if said final gradient is greater than a first threshold value and into an edge class if said final gradient is greater than a second threshold value and is less than a third threshold value;

calculating an activity value with respect to the first pixel values in said macroblock by calculating the sum of absolute values of DCT coefficients for four blocks in said macroblock;

calculating an activity normalization coefficient, using said activity value of said macroblock and an average activity value of all pixels of a same picture type; and calculating a reference quantization step size produced by a backward rate control through a forward estimation considering coding efficiency and a visual characteristic which depends on the class of the moving picture signal and the energy of DCT coefficients as represented by said activity normalization coefficient.

2. A quantizer, comprising:

means for calculating horizontal gradients of first pixel values of a moving picture signal in a macroblock and calculating a mean value of the respective gradients;

means for calculating vertical gradients of said first pixel values in said macroblock and calculating a mean value of the respective vertical gradients;

means for determining a final gradient by comparison of said horizontal and vertical gradients;

means for classifying said moving picture signal into a complexity class if said final gradient is greater than a first threshold value and into an edge class if said final gradient is greater than a second threshold value and less than a third threshold value;

means for calculating an activity value with respect to said first pixel values in said macroblock by calculating the sum of absolute values of DCT coefficients for four blocks in said macroblock;

means for calculating an activity normalization coefficient, using said activity value of said macroblock and an average activity value of all pixels of a same picture type; and means for calculating a reference quantization step size produced by a backward rate control through a forward estimation considering coding efficiency and a visual characteristic which depends on the class of the moving picture signal and the energy of DCT coefficients as represented by said activity normalization coefficient.

* * * * *

UNITED STATES PATENT AND TRADEMARK OFFICE
CERTIFICATE OF CORRECTION

PATENT NO. : 5,699,119
DATED : December 16, 1997
INVENTOR(S) : Tae-yun Chung et al.

It is certified that error appears in the above-indentified patent and that said Letters Patent is hereby corrected as shown below:

Col. 4, line 42, "value" should be -- values --.

Signed and Sealed this

Twenty-eighth Day of July, 1998

Attest:

BRUCE LEHMAN

*Attesting Officer*      *Commissioner of Patents and Trademarks*